US007287971B2

(12) United States Patent
Uchiyama et al.

(10) Patent No.: US 7,287,971 B2
(45) Date of Patent: Oct. 30, 2007

(54) LOAD DETERMINING DEVICE FOR AN ELECTRICALLY-OPERATED INJECTION MOLDING MACHINE

(75) Inventors: Tatsuhiro Uchiyama, Gotenba (JP); Minoru Kobayashi, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 279 days.

(21) Appl. No.: 11/056,369

(22) Filed: Feb. 14, 2005

(65) Prior Publication Data
US 2005/0181088 A1   Aug. 18, 2005

(30) Foreign Application Priority Data
Feb. 17, 2004   (JP)   ............... 2004-040406

(51) Int. Cl.
*B29C 45/76* (2006.01)
(52) U.S. Cl. ............ 425/145; 425/147; 425/166; 425/169
(58) Field of Classification Search ........ 425/147, 425/166, 145, 169
See application file for complete search history.

(56) References Cited

U.S. PATENT DOCUMENTS

| | | | | |
|---|---|---|---|---|
| 4,970,447 A | * | 11/1990 | Kamiguchi et al. | ........ 425/145 |
| 5,110,522 A | * | 5/1992 | Inaba et al. | ........ 425/147 |
| 5,217,725 A | * | 6/1993 | Inaba et al. | ........ 425/145 |
| 5,997,780 A | * | 12/1999 | Ito et al. | ........ 425/149 |
| 6,340,439 B1 | * | 1/2002 | Hiraoka | ........ 425/145 |
| 6,341,953 B1 | * | 1/2002 | Okubo et al. | ........ 425/145 |
| 6,527,534 B1 | | 3/2003 | Kamiguchi et al. | |
| 6,533,572 B1 | * | 3/2003 | Koide | ........ 425/587 |
| 6,616,872 B2 | | 9/2003 | Kamiguchi et al. | |
| 6,726,861 B2 | * | 4/2004 | Takashi | ........ 264/40.1 |

(Continued)

FOREIGN PATENT DOCUMENTS

DE   43 33 675   4/1995

(Continued)

OTHER PUBLICATIONS

Japanese Office Action, mailed on Oct. 13, 2006, in a corresponding Japanese Patent Application.

(Continued)

*Primary Examiner*—Tim Heitbrink
(74) *Attorney, Agent, or Firm*—Staas & Halsey LLP

(57) ABSTRACT

A load determining device for an electrically-operated injection molding machine in which a load exerted on a movable part is detected based on the motor current or by an observer, with removing the influence of motor temperature. Upon start of continuous molding, a maximum load detected during retreat motion of an ejector or movable part is stored as a reference value Lr0. In every molding cycle, a maximum detected load Lra during the retraction of the ejector is determined. In the next molding cycle, load La detected during advance of the ejector is corrected based on the reference value Lr0 and the maximum detected load Lra to eliminate the influence of motor temperature rise, thereby determining the load Lfx(n) during the advance of the ejector. When there occurs a change in temperature of the ejector driving motor, the load detected based on the motor current or by the observer varies even if the actual ejector load is constant. By eliminating the influence of temperature change, the load can accurately be detected.

8 Claims, 3 Drawing Sheets

U.S. PATENT DOCUMENTS

| | | | |
|---|---|---|---|
| 6,814,558 B2 * | 11/2004 | Kubota et al. | 425/145 |
| 6,833,092 B2 * | 12/2004 | Usui | 264/40.1 |

FOREIGN PATENT DOCUMENTS

| | | |
|---|---|---|
| EP | 1 175 989 | 1/2002 |
| EP | 1 205 291 | 5/2002 |
| JP | 61-196779 | 8/1986 |
| JP | 6079766 | 3/1994 |
| JP | 8020052 | 1/1996 |
| JP | 10-119107 | 5/1998 |
| JP | 2001030326 | 8/2000 |
| JP | 2001-38775 | 2/2001 |
| JP | 2002-18924 | 1/2002 |
| JP | 2002036321 | 2/2002 |
| JP | 2002-144383 | 5/2002 |
| JP | 2003-236898 | 8/2003 |

OTHER PUBLICATIONS

Gotter, G., "Erwaermung und Kuehlung elektrischer Maschinen, Zeitlich Veraenderliche Vorgaenge," Erwaermung Und Kuehlung Elektrischer Maschinen, 1954, pp. 95-110.

European Search Report and Annex dated Jun. 2, 2005 of Application No. EP 05 25 0770.

* cited by examiner

LOAD DETERMINING DEVICE FOR AN ELECTRICALLY-OPERATED INJECTION MOLDING MACHINE

BACKGROUND OF THE INVENTION

1. Field of the Invention

The present invention relates to an electrically-operated injection molding machine, and more particularly, to a device for determining the load exerted on a movable part of an injection molding machine.

2. Description of Related Art

In injection molding machines, a method has often been adopted that determines abnormality of a movable part based on the load applied thereto. Especially in electrically-operated injection molding machines, in order to detect abnormality of the movable part, etc., the load exerted on a moving-part driving motor is detected based on the motor current or the like, without using a special hardware sensor such as a load sensor for detecting the load exerted on the movable part.

For example, there has been known an invention in which the load exerted on an ejector is estimated by means of a load estimating observer incorporated into a controller for an ejector driving motor, and an abnormal action is detected based on the estimated load, thus preventing an ejector rod from colliding with a member in a mold due to an error in setting an amount of projection of the ejector rod, so as to prevent in advance damages of the mold member and the ejector mechanism. Apart from estimating the load by means of the load estimating observer, the just-mentioned invention also adopts a method for detecting the load based on a commanded motor current or an actual motor current in view of the fact that the motor driving current varies in proportion to the load exerted on the motor (refer to JP 10-119107A).

Also known is a method for sampling the estimated disturbance torque at intervals of a predetermined period, which is similarly estimated by means of the observer, and for detecting an abnormal load when an average value of sampled torques exceeds an allowable value (refer to JP 2001-38775A). It is also known to detect the driving current for a knock-pin driving motor during the process of pushing a molded product out of the mold by means of knock pins, and determine an occurrence of abnormality when a driving current pattern is deviated out of an allowable range defined by a reference pattern (refer to JP 2002-18924A).

There has also been known an invention in which the load exerted on an ejector driving motor is estimated by use of a disturbance estimating observer or the like, the mold release force with which a molded product is released from the mold is determined based on the estimated load, and the state and quality of the molded product is detected based on the magnitude of the mold release force (JP 2002-144383A).

As mentioned above, the electrically-operated injection molding machine is designed to detect the load exerted on the moving-part driving motor based on the motor driving current value or by means of the observer incorporated into the motor control circuit, and on the basis of the detected load, determine the quality of molded products as well as occurrences of abnormality.

In the electrically-operated injection molding machine, the detection of load exerted on the movable part being made based on the driving current of the moving-part driving motor or by means of the observer is advantageous in that it results in a low-price arrangement which does not require any hardware such as a torque sensor for load detection.

When the electrically-operated injection molding machine is continuously operated, however, the motor temperature increases with elapse of time. Such change in motor temperature results in a change in the driving current and in the estimated torque detected by the observer, even when the motor load remains unchanged.

FIG. 4 shows a relationship between motor temperature and load detected by the disturbance load observer, which is observed when the actual motor load is constant. With the increase in motor temperature, the load detected by the disturbance load observer increases as illustrated, and deviates from the actually applied load.

SUMMARY OF THE INVENTION

The present invention provides a load determining device for an electrically-operated injection molding machine, which is capable of determining the load based on a driving state of a servomotor with removing an influence of a temperature variation of the servomotor and without the need of provision of a special hardware such as a sensor for load detection.

The load determining device of the present invention determines a load exerted on a movable part driven by a servomotor of an electrically-operated injection molding machine in a plurality of molding cycles. The load determining device comprises: detecting means for detecting the load exerted on the movable part based on a driving state of the servomotor; storing means for storing a value of the load detected by the detecting means at a reference point where the load is regarded as being constant in the plurality of molding cycles, as a reference value; determining means for determining a comparative value as a value of the load detected by the detecting means at the reference point in each molding cycle; and correcting means for correcting a value of the load detected by the detecting means during each molding cycle based on the stored reference value and the comparative value determined in a molding cycle preceding a present molding cycle. With the above constitution, the influence of temperature variation of the servomotor on the detection of the load by the detecting means is eliminated.

The detecting means may comprise a disturbance load observer incorporated in a control system of the servomotor. Alternatively, the detecting means detects the load exerted on the movable part based on a driving current of the servomotor or a current command for the servomotor.

The reference point may be set as a position of the movable part where a maximum load is detected in a section of movement of the movable part where the disturbance load is regarded as being constant in the plurality of molding cycles.

Alternatively, the reference point may be set as a predetermined position of the movable part in a section of movement of the movable part where the disturbance load is regarded as being constant in the plurality of molding cycles. Further, the reference point may be set as a position of the movable part when a predetermined period of time elapses from beginning of a section of movement of the movable part where the disturbance load is regarded as being constant in the plurality of molding cycles.

In a case where the load exerted on the movable part driven by a motor is detected by a disturbance load observer or detected based on the driving current or current command for the motor, the detected load varies depending on motor temperature, even if the actual load is constant. The present invention is capable of determining the load by eliminating the influence of motor temperature, and therefore, the present invention does not require a special sensor or the like for detecting the load exerted on the movable part, and can be constructed at low price.

DETAILED DESCRIPTION

Figure 1:
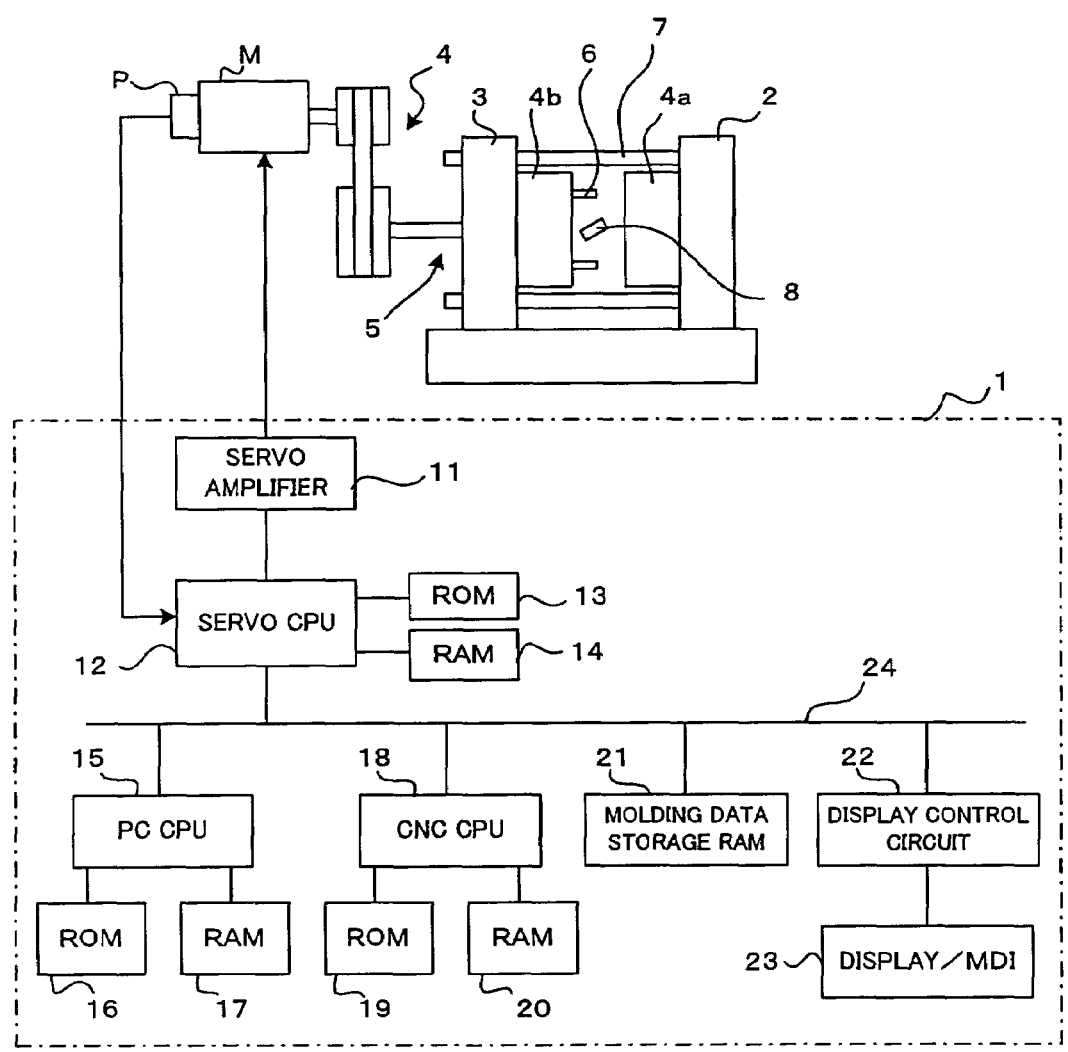
FIG. 1 is a block diagram showing essential part of one embodiment of the present invention.

FIG. 1 is a block diagram showing essential part of one embodiment of the present invention. The present embodiment shows an example where the present invention is exerted on an ejector that serves as a movable part of an electrically-operated injection molding machine.

Reference numeral 1 denotes a controller that controls the electrically-operated injection molding machine. A load determining device of the present invention is incorporated into the controller 1. The controller 1 includes a CNC CPU 18 which is a microprocessor for numerical control, a PC CPU 15 which is a microprocessor for a programmable controller, and a servo CPU 12 which is a microprocessor for servo control. Information transmission between these microprocessors can be made through the medium of a bus 24 by selecting an input to and an output from each microprocessor.

Connected to the PC CPU 15 are a ROM 16 storing a sequence program used to control sequence operations of the injection molding machine, a program used for the processing of the present invention to correct detected load, etc., and a RAM 17 used for temporal storage of computation data, etc. Connected to the CNC CPU 18 are a ROM 19 storing an automatic operation program used for overall control of the injection molding machine, etc., and a RAM 20 used for temporal storage of calculation data, etc.

A ROM 13 storing control programs used only for servo control to perform the processing for position, speed and current loops, and a RAM 14 used for temporal data storage are connected to the servo CPU 12. Also connected to the servo CPU 12 is a servo amplifier 11 that drives axis servomotors M for mold clamping, injection, screw rotation, ejector, etc. in accordance with commands that are supplied from the servo CPU 12 to which outputs from position/speed detectors P attached to the axis servomotors M are fed back respectively. In FIG. 1, only shown are the servomotor M for driving the ejector axis (ejector mechanism), and the position/speed detector P attached thereto for detecting the position, etc. of ejector pins in terms of the rotational position of the servomotor.

A manual data input device 23 with a display device is connected to the bus 24 through a display control circuit 22. The display device may be a CRT display or a liquid crystal display.

A data storage RAM 21 comprised of a non-volatile memory is a molding-data storage memory for storing molding conditions for injection molding operations as well as various setting values, parameters, macro variables, etc.

Stationary and movable molds 4a, 4b are attached to stationary and movable platens 2 and 3, respectively. The movable platen 3 is driven along tie bars 7 by means of a driving mechanism (not shown) for mold closing, mold clamping, and mold opening operations. The ejector-axis driving motor M drives a ball-screw/nut mechanism 5 through transmission means 4 comprised of pulleys and belts, thereby driving the ejector mechanism to move ejector pins 6 relative to the movable mold 4b to which a molded product 8 is adhered, thereby pushing the molded product out of the movable mold.

With the aforementioned construction, the PC CPU 15 controls sequence operations of the entire injection molding machine, and the CNC CPU 18 distributes motion commands to the respective axis servomotors in accordance with the operation program stored in the ROM 19 and the molding conditions, etc. stored in the data storage RAM 21. In accordance with the motion commands distributed to the respective axes and position and speed feedback signals detected by the position/speed detector P, and the like, the servo CPU 12 performs conventional servo control such as position, speed, and current loop controls, thereby performing the so-called digital servo processing.

The aforesaid construction is the same as a conventional controller of an electrically-operated injection molding machine, and the load determining device of the present invention is constituted by the controller 1 of this kind. Differences from the conventional controller reside in that the disturbance load observer for estimating motor load is incorporated into the motor control performed by the servo CPU 12, and the below-mentioned processing performed by the PC CPU 15 to detect the ejector load by use of the disturbance load observer is incorporated into the ROM 16.

Figure 2:
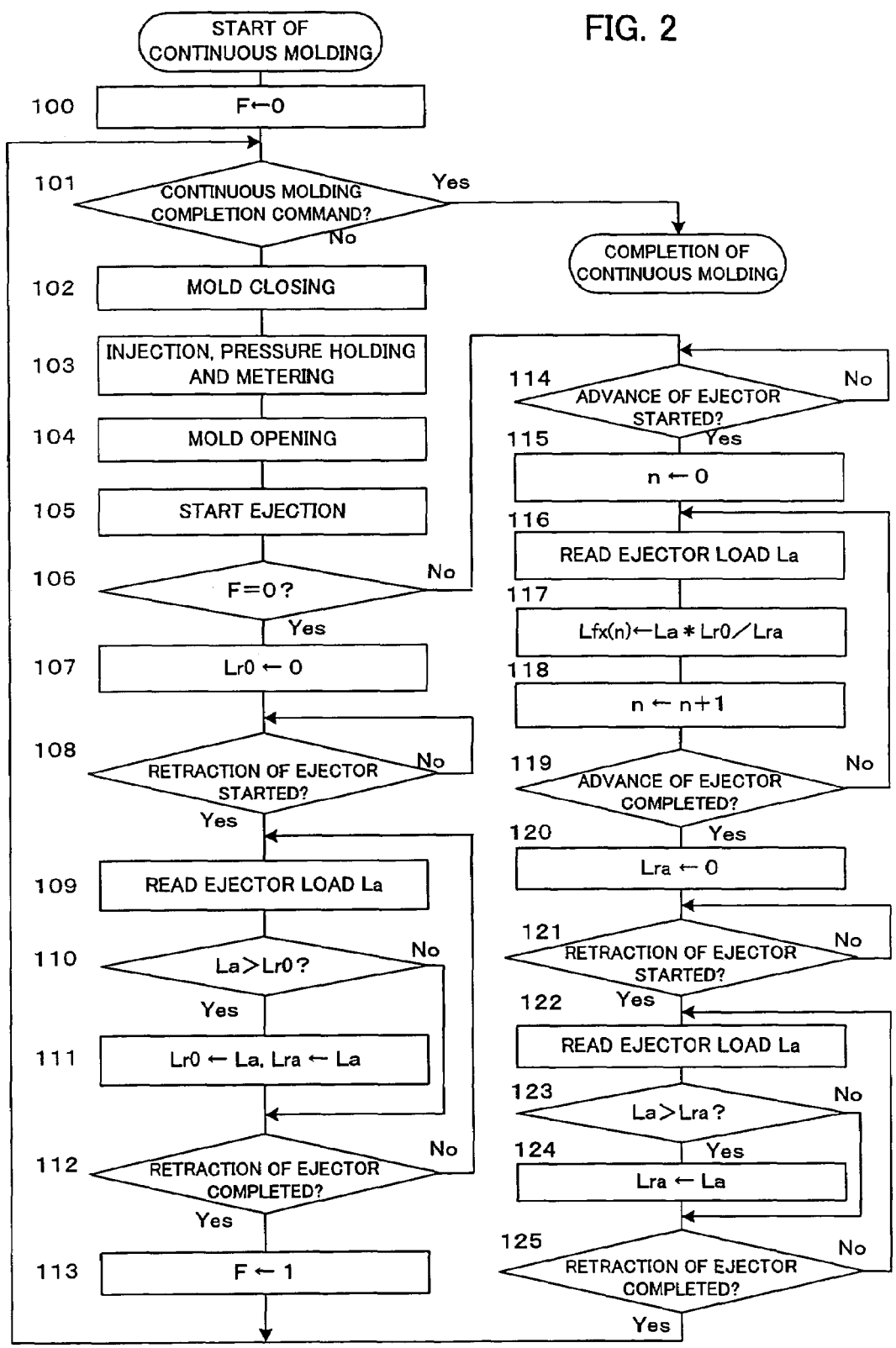
FIG. 2 is a flowchart mainly showing the processing to correct and determine the ejector load in the embodiment.

FIG. 2 is a flowchart showing processing for molding operations, which includes processing performed by the PC CPU 15 of the controller 1 serving as the load determining device.

Upon start of continuous molding, a flag F is set to "0" (Step 100), and it is determined whether or not a continuous-molding completion command is input (Step 101). If the continuous molding is not to be finished, steps of mold closing, injection, pressure holding, metering, and mold opening are performed (Steps 102-104), and an ejecting operation is started (Step 105). More specifically, the ejection servomotor M is driven by the servo CPU 12 through the servo amplifier 11 to drive the ejector mechanism, thereby starting the action to project the eject pins 6 into the inside of the movable mold 4b to push off the molded product 8 from the movable mold 4b.

Next, it is determined whether or not the flag F is "0" (Step 106). Initially, the flag has been set at "0" at Step 100, and therefore, the flow advances to Step 107 where a value of "0" is stored in a register for storing, as a reference value Lr0, a maximum value of load exerted on the ejector during the retraction of the ejector (during the action of moving the eject pins 6 back into the movable mold 4b). The PC CPU 15 waits for start of the retraction of the ejector in the ejector operating cycle (Step 108). When the retraction is started, an ejector load La is read out that is determined by the processing of the disturbance load observer performed by the servo CPU 12 (Step 109), and the ejector load La is compared with the reference value Lr0 (Step 110). When the detected ejector load La is larger than the reference value Lr0, the detected load La is stored as the reference load Lr0 in the register, and is also stored in a register for storing the maximum value Lra of ejector loads in the preceding molding cycle (Step 111). Next, it is determined whether or not the retraction of the ejector is completed (Step 112). Until the retraction of the ejector is completed, the processing of Steps 109-112 is repeatedly carried out. As a result, the maximum value of ejector loads detected during the retraction of the ejector is stored as the reference value Lr0 and as the maximum value Lra of ejector loads in the preceding molding cycle. In a section of the ejector being retreated, the ejector load is equivalent to friction produced when the eject pins 6, etc. are caused to move, and therefore, basically no load is exerted on the ejector in the retreat section. Ordinarily, the ejector retreat section is a section where the load can be regarded as being the same in every ejector action. When the retraction of the ejector is completed, the flag F is set to "1" (Step 113) and the flow returns to Step 101.

In the next molding cycle, the processing of Steps 101-106 is performed. Since the flag F has been set to "1" at Step 106, the flow advances to Step 114 where the PC CPU 15 waits for start of the advance of the ejector, sets an index n to "0" (Step 115), and reads out the ejector load La determined by the disturbance load observer (Step 116). The ejector load La thus read is multiplied by a ratio (Lr0/Lra) of the reference value Lr0 to the maximum load Lra detected during the retraction of the ejector in the preceding molding cycle, whereby a corrected load Lfx(n) at the time of advance of the ejector is determined and stored in the RAM 17 (Step 117). Next, the index n is incremented by one (Step 118), and it is determined whether or not the advance of the ejector is completed (Step 119). If the advance is not completed, the flow returns to Step 116. By repeatedly performing the processing of Steps 116-119 at intervals of a predetermined period, a corrected load waveform in respect of the load exerted on the ejector during the advance action of the ejector is stored in the RAM 17.

When the advance of the ejector is completed, the register for storing the maximum load Lra observed during the retraction of the ejector is cleared to "0" (Lra=0) (Step 120). The PC CPU 15 waits for the start of the retraction of the ejector, reads out the ejector load La determined by the disturbance load observer, and compares the ejector load La with the maximum load Lra detected during the retraction of the ejector and stored in the register (Step 123). If the ejector load La determined by the disturbance load observer is larger, the ejector load La is stored as the maximum load Lra at the time of the retraction of the ejector (Step 124). Until it is detected that the retraction of the ejector is completed (Step 125), the processing of Steps 122-125 is performed at intervals of a predetermined period. As a result, the maximum load Lra among the ejector loads La determined by the disturbance load observer during the retreat action of the ejector is stored in the register. In the processing of Step 117 for the next molding cycle, the thus stored maximum load is utilized as the maximum load Lra during the retraction of the ejector in the preceding molding cycle.

When the retraction of the ejector is completed, the flow returns from Step 125 to Step 101 and performs the processing of Step 101 and the subsequent steps. Since the flag F has been set to "1," the processing of Steps 101-106 and 114-125 is carried out in each subsequent molding cycle. When it is confirmed at Step 101 that the continuous molding is completed, the aforementioned processing for the continuous molding actions is finished.

Figure 3:
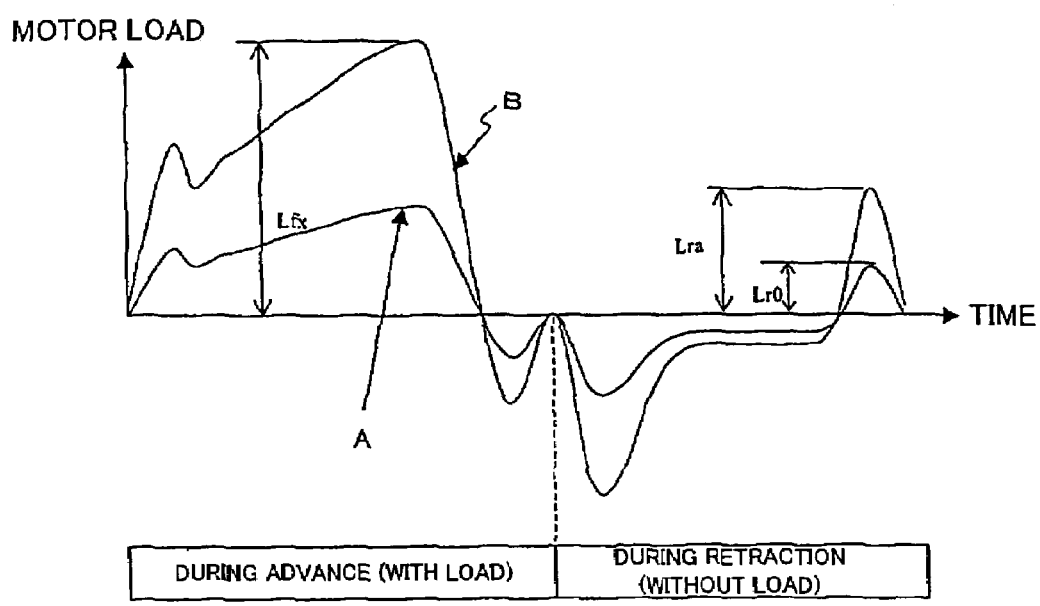
FIG. 3 is an explanatory view for explaining a relationship between detected load and correction in the embodiment.
Figure 4:
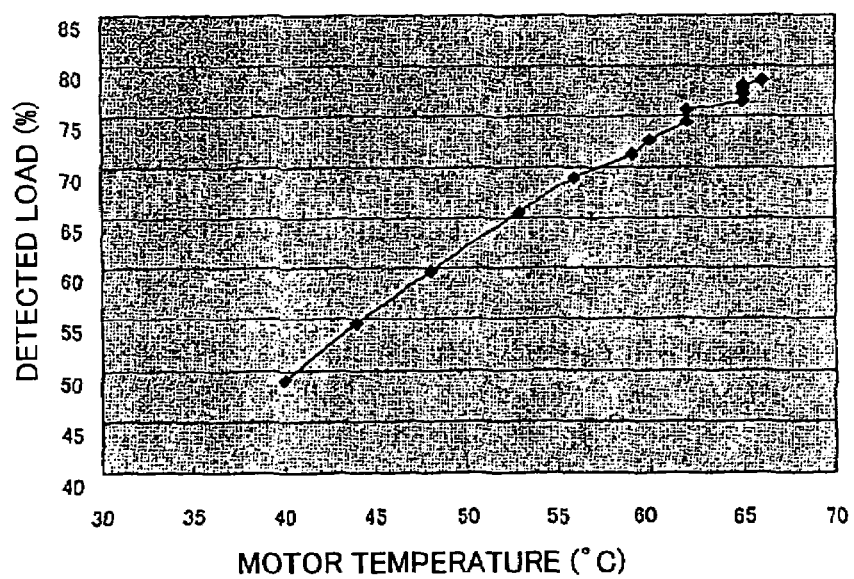
FIG. 4 is a view showing a relationship between motor temperature and estimated load detected by a disturbance load observer in a state where the load is kept constant.

FIG. 3 shows a waveform of ejector load. It is assumed here that the reference waveform A of ejector load shown in FIG. 3 is detected by the disturbance load observer in the first molding cycle after the start of the continuous molding. In this case, the ejector load is repeatedly detected during the retreat action of the ejector, and the maximum value Lr0 of the load detected at Step 111 is stored in the register and also stored as the maximum load Lra in the retreat action in the preceding molding cycle (Lr0=Lra).

In the next second molding cycle, since the ratio (Lr0/Lra) to be multiplied to the detected ejector load La is equal to "1," the corrected ejector load Lfx(n) at the time of advance of the ejector that is determined at Step 117 is nearly the same as the reference waveform A shown in FIG. 3. Nevertheless, if the detected load La is larger than the currently stored maximum load Lra, the detected load La is stored as the maximum load Lra at the time of retraction of the ejector in the processing of Steps 123 and 124 performed in every molding cycle. For this reason, as the continuous molding is continued and the temperature of the ejector driving servomotor M increases, the ejector load detected by the disturbance load observer changes and increases, even if the load actually exerted on the servomotor M is kept unchanged. More specifically, the load observed during the retreat action of the ejector is regarded as being equivalent to friction in the ejector mechanism and as being kept the same in every molding cycle. As the motor temperature increases, however, this temperature rise causes the ejector load detected by the disturbance load observer to change as shown by a waveform B in FIG. 3. Even if the actual motor load is the same, the maximum load detected during the retraction of the ejector changes from the reference value Lr0, which is the maximum load at the time of retraction in the first molding cycle, to Lra as shown in FIG. 3. This indicates that the detected load is increased by the magnification of Lra/Lr0 despite that the actual load is the same.

During the advance of the ejector, the eject pins 6 push the molded product out of the movable mold 4b, and thus the load actually exerted on the servomotor changes in every molding cycle. Apart from this, the change in motor temperature affects the detected load to the same degree irrespective of whether the ejector is advanced or retreated. It is considered therefore that, with increase in motor temperature, the motor load detected during the advance of the ejector is increased by the same magnification as in the retraction of ejector. Accordingly, in the determination of the ejector load Lfx(n) at Step 117, if the ejector load La detected by the disturbance load observer is multiplied by the reciprocal (Lr0/Lra) of the just-mentioned magnification (Lra/Lr0), the load exerted on the motor or the load exerted on the ejector from which the influence of motor temperature rise is eliminated can be determined.

In this manner, the load exerted on the ejector which is a movable part of the injection molding machine can be determined based on the estimated load detected by the disturbance load observer, from which the influence of the motor temperature rise is removed. In a case where an abnormal load caused by collision or the like is detected on the basis of the determined load, such abnormality detection can be made with accuracy by use of the corrected load Lfx(n) determined at Step 117. Similarly, when the quality of molded product, the mold release force, or the like is determined based on the load exerted on the ejector, accurate determination can also be ensured since the load can be determined with much accuracy by eliminating the influence of motor temperature rise.

In the foregoing embodiment, the load exerted on the ejector is detected by means of the disturbance load observer that is incorporated into the control system for the ejector driving servomotor. Instead of using the disturbance load observer, the load exerted on the ejector may be determined based on the driving current for the servomotor M (current feedback) or the current command that is a torque command used to drive the servomotor M. Also in this case, since the motor temperature rise influences the ejector load, processing similar to that in the aforementioned embodiment is carried out to determine the corrected ejector load.

In the embodiment, the ratio which is to be multiplied to the detected load La in order to determine the corrected load is determined based on the maximum load at the time of retraction of the ejector. However, it is not essentially required to use the maximum load. Alternatively, the load Lr0 serving as reference may be determined in that molding cycle part in which the load can be regarded as being constant in every molding cycle, and the load may be determined as Lra in every molding cycle in the same part as the just-mentioned molding cycle part, from both of which the ratio (Lr0/Lra) to be multiplied to the detected load La may be determined. For example, the reference load Lr0 and the corresponding load Lra in the preceding molding cycle may be determined at a particular position during the retraction of the ejector or at a time point where a predetermined period of time has elapsed from the start of the retraction of the ejector.

The foregoing embodiment shows a case where the present invention is exerted on the ejector which is a movable part of the injection molding machine. The present invention is also applicable to the determination of load that is exerted on another movable part of the injection molding machine. In such a case, the load detected by use of a disturbance load observer or based on the driving current or the like may be corrected in every molding cycle by using the correction ratio determined from the reference load Lr0 and the load Lra in the preceding molding cycle that are determined at a position or a time point where the load is constant.

What is claimed is:

1. A load determining device for determining a load exerted on a movable part driven by a servomotor of an electrically-operated injection molding machine in a plurality of molding cycles, said load determining device comprising:

detecting means for detecting the load exerted on the movable part based on a driving state of the servomotor;

storing means for storing a value of the load detected by said detecting means at a reference point where the load is regarded as being constant in the plurality of molding cycles, as a reference value;

determining means for determining a comparative value as a value of the load detected by said detecting means at the reference point in each molding cycle; and correcting means for correcting a value of the load detected by said detecting means during each molding cycle based on the stored reference value and the comparative value determined in a molding cycle preceding a present molding cycle.

2. A load determining device according to claim 1, wherein said detecting means comprises a disturbance load observer incorporated in a control system of the servomotor.

3. A load determining device according to claim 1, wherein said detecting means detects the load exerted on the movable part based on a driving current of the servomotor.

4. A load determining device according to claim 1, wherein said detecting means detects the load exerted on the movable part based on a current command for the servomotor.

5. A load determining device according to claim 1, wherein the reference point is set as a position of the movable part where a maximum load is detected in a section of movement of the movable part where the load is regarded as being constant in the plurality of molding cycles.

6. A load determining device according to claim 1, wherein the reference point is set as a predetermined position of the movable part in a section of movement of the movable part where the load is regarded as being constant in the plurality of molding cycles.

7. A load determining device according to claim 1, wherein the reference value is determined as a value of the load detected by said determining means when a predetermined period of time has elapsed from beginning of a section of movement of the movable part where the load is regarded as being constant in the plurality of molding cycles.

8. A load determining device according to claim 1, wherein the movable part comprises an ejector for ejecting molded product of the injection molding machine.

* * * * *